US011962055B2

(12) United States Patent
Deleniv et al.

(10) Patent No.: US 11,962,055 B2
(45) Date of Patent: Apr. 16, 2024

(54) WAVEGUIDE BAND-STOP FILTER ARRANGEMENT

(71) Applicant: Telefonaktiebolaget LM Ericsson (publ), Stockholm (SE)

(72) Inventors: Anatoli Deleniv, Mölndal (SE); Peter Melin, Lindome (SE); Ove Persson, Hunnebostrand (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 17/621,791

(22) PCT Filed: Jun. 28, 2019

(86) PCT No.: PCT/SE2019/050645
§ 371 (c)(1),
(2) Date: Dec. 22, 2021

(87) PCT Pub. No.: WO2020/263148
PCT Pub. Date: Dec. 30, 2020

(65) Prior Publication Data
US 2022/0416386 A1 Dec. 29, 2022

(51) Int. Cl.
*H01P 1/209* (2006.01)
*H01P 3/12* (2006.01)

(52) U.S. Cl.
CPC ................ *H01P 1/209* (2013.01); *H01P 3/12* (2013.01)

(58) Field of Classification Search
CPC ...... H01P 1/2039; H01P 1/203; H01P 1/2005; H01P 1/20381; H01P 1/20; H01P 1/201;
(Continued)

(56) References Cited

U.S. PATENT DOCUMENTS

| | | | |
|---|---|---|---|
| 3,748,604 | A | 7/1973 | Wang |
| 10,050,321 | B2 | 8/2018 | Rogozine et al. |
| 2016/0336632 | A1 | 11/2016 | Rogozine et al. |

FOREIGN PATENT DOCUMENTS

| | | | |
|---|---|---|---|
| CN | 201011666 | Y | 1/2008 |
| CN | 104868211 | B | 11/2017 |

(Continued)

OTHER PUBLICATIONS

Cameron, et al., "Direct-Coupled Microwave Filters With Single and Dual Stopbands," IEEE Transactions on Microwave Theory and Techniques, vol. 53, Issue 11, Nov. 2005, pp. 3288-3297.

(Continued)

*Primary Examiner* — Diana J. Cheng
(74) *Attorney, Agent, or Firm* — Withrow & Terranova, PLLC

(57) ABSTRACT

The present disclosure relates to waveguide band-stop filter arrangement adapted to be connected to a waveguide transmission line at a filter interface, where the waveguide transmission line is adapted for a main propagation extension. The band-stop filter arrangement comprises a first pair of cavities, where each cavity in the first pair, each first pair cavity, comprises a corresponding inductive first pair aperture arrangement that is adapted to connect the corresponding first pair cavity to the waveguide transmission line. The first pair cavities are positioned adjacent each other along a stacking extension perpendicular to the main propagation extension such that they share a first common wall and are adapted to be positioned adjacent the waveguide transmission line. The first pair of cavities comprises a first capacitive aperture arrangement in the first common wall, mutually connecting the first pair cavities.

3 Claims, 3 Drawing Sheets

(58) Field of Classification Search
CPC ............ H01P 1/20354; H01P 1/20327; H03H 2001/0085; H03H 7/1766; H03H 2001/0042; H03H 1/0007; H03H 7/0123; H03H 7/06; H03H 7/38; H03H 7/0115; H03H 2007/013; H03H 7/1775; H03H 7/46; H03H 7/12; H03H 1/00; H03H 7/1758; H03H 7/42; H03H 7/1741; H03H 7/17; H03H 7/01; H03H 7/00; H03H 2001/0021
See application file for complete search history.

(56) References Cited

FOREIGN PATENT DOCUMENTS

| | | | |
|---|---|---|---|
| CN | 107636890 | A | 1/2018 |
| EP | 2741364 | A2 | 6/2014 |
| FR | 2285729 | A1 | 4/1976 |

OTHER PUBLICATIONS

Cameron, Richard, "Advanced Filter Synthesis," IEEE Microwave Magazine, Oct. 2011, pp. 42-61.
International Search Report and Written Opinion for International Patent Application No. PCT/SE2019/050645, dated Jan. 31, 2021, 11 pages.
First Office Action for Chinese Patent Application No. 2019800976838, dated Feb. 16, 2023, 10 pages.
Extended European Search Report for European Patent Application No. 19934883.0, dated Apr. 22, 2022, 7 pages.
Cameron, et al., "Direct-Coupled Bandstop Filters," Microwave Filters for Communications Systems (book), Section 10.2.1, Wiley-Interscience, 2007, pp. 366-370.

SECTION A-A

WAVEGUIDE BAND-STOP FILTER ARRANGEMENT

This application is a 35 U.S.C. § 371 national phase filing of International Application No. PCT/SE2019/050645, filed Jun. 28, 2019, the disclosure of which is incorporated herein by reference in its entirety.

TECHNICAL FIELD

The present disclosure relates to a waveguide band-stop filter arrangement adapted to be connected to a waveguide transmission line at a filter interface.

BACKGROUND

Despite quite impressive progress demonstrated in the last few decades in the microwave engineering area, the important role of waveguide components remains undisputed, this is due to their low loss and high power capability performance.

Waveguide band-stop filters are widely used in communication systems for suppression of undesired signals. Ideal band-stop filter should have large spurious-free transmission performance with good match. In theory this can be achieved by means of direct coupled band-stop filters. Practically, there is little information on realization of such filters using waveguide cavities in open sources. Most band-stop filters use a series of band-stop cavities placed at quarter-wavelength intervals along a main transmission line, so-called extracted cavity filters.

Using extracted cavities results in bulky filters since the spacing between the resonators is proportional to quarter-wavelength transformers. Tuning of these filters over a relatively large frequency band is complicated or maybe even impossible since dispersive coupling of extracted cavities that cannot be compensated with tuning screws. The filters are therefore designed for a specific frequency and will become more narrow-banded when tuned down from this frequency. It is obvious that it is a limiting factor if tunability over large frequency range is required.

A design example of direct coupled band-stop filter is disclosed in the paper "Microwave Filters for Communication Systems", Wiley-Interscience, A John Wiley&Sons, Inc., Publication, 2007, by Richard J. Camerun, Chandra M. Kudsia and Raafat R. Mansour. Compared to the extracted cavity filters, this is more compact design, however it has similar limitations in terms of narrow tuning range. This is due resonant cavities coupled to a broad wall of waveguide that results in identical limitation for coupling control.

Practical realization of direct coupled band-stop filter with cavities coupled to a narrow wall of the main waveguide results in strong coupling between these cavities, this is due to local modes generated by their respective coupling irises. This coupling is parasitical, i.e. unintended and cannot be controlled and, therefore, arbitrary placement/location of reflection zeroes cannot be achieved. Furthermore, any uncontrollable coupling limits a tunability range of the filter . . . .

There is thus a desire to provide a direct-coupled band-stop filter arrangement using cavities without the above disadvantages

SUMMARY

The object of the present disclosure is to provide a direct-coupled band-stop filter arrangement using cavities without the previously discussed disadvantages.

This object is obtained by means of a waveguide band-stop filter arrangement adapted to be connected to a waveguide transmission line at a filter interface, where the waveguide transmission line is adapted for a main propagation extension. The band-stop filter arrangement comprises a first pair of cavities, where each cavity in the first pair, each first pair cavity, comprises a corresponding inductive first pair aperture arrangement that is adapted to connect the corresponding first pair cavity to the waveguide transmission line. The first pair cavities are positioned adjacent each other along a stacking extension perpendicular to the main propagation extension such that they share a first common wall and are adapted to be positioned adjacent the waveguide transmission line. The first pair of cavities comprises a first capacitive aperture arrangement in the first common wall, mutually connecting the first pair cavities.

This provides a waveguide band-stop filter arrangement of compact size, admitting arbitrary location of reflection zeroes and offering tuneability in a relatively wide frequency range with stable stop-band width due to enhanced control of the present electromagnetic couplings. Generally, direct-coupled bandstop filters have better wide band performance than other types of band-stop filters According to some aspects, an arbitrary number of cavity pairs can be added. Generally, according to some aspects, the band-stop filter arrangement further comprises at least one further pair of cavities, where each further pair of cavities is connected to an adjacent pair of cavities that is positioned between the further pair of cavities and the filter interface. Each cavity in a further pair, each further pair cavity, comprises a corresponding inductive further pair aperture arrangement that is adapted to connect the corresponding further pair cavity to a corresponding adjacent cavity via a corresponding common inter-pair wall. The further pair cavities are positioned adjacent each other along the stacking direction such that they share a further common wall, and the further pair of cavities comprises a further capacitive aperture arrangement in the further common wall, mutually connecting the further pair cavities.

This means that an arbitrary number of cavity pairs can be added.

According to some aspects, at least one pair of cavities comprises a complementary aperture arrangement arranged in a corresponding common wall, where each complementary aperture arrangement comprises at least one tuning screw.

In this manner, an increased control of the present electromagnetic couplings is enabled.

BRIEF DESCRIPTION OF THE DRAWINGS

The present disclosure will now be described more in detail with reference to the appended drawings, where.

DETAILED DESCRIPTION

Figure 1:
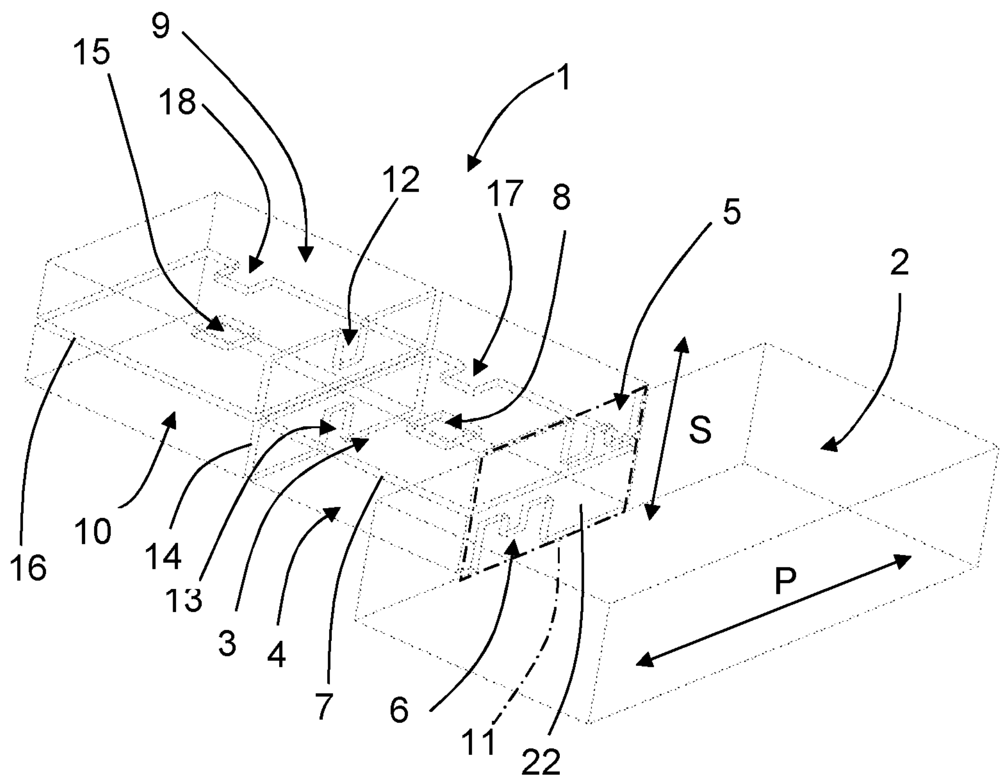
FIG. 1 shows a first simplified perspective view of a waveguide stop-band filter and a waveguide transmission line.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 2:
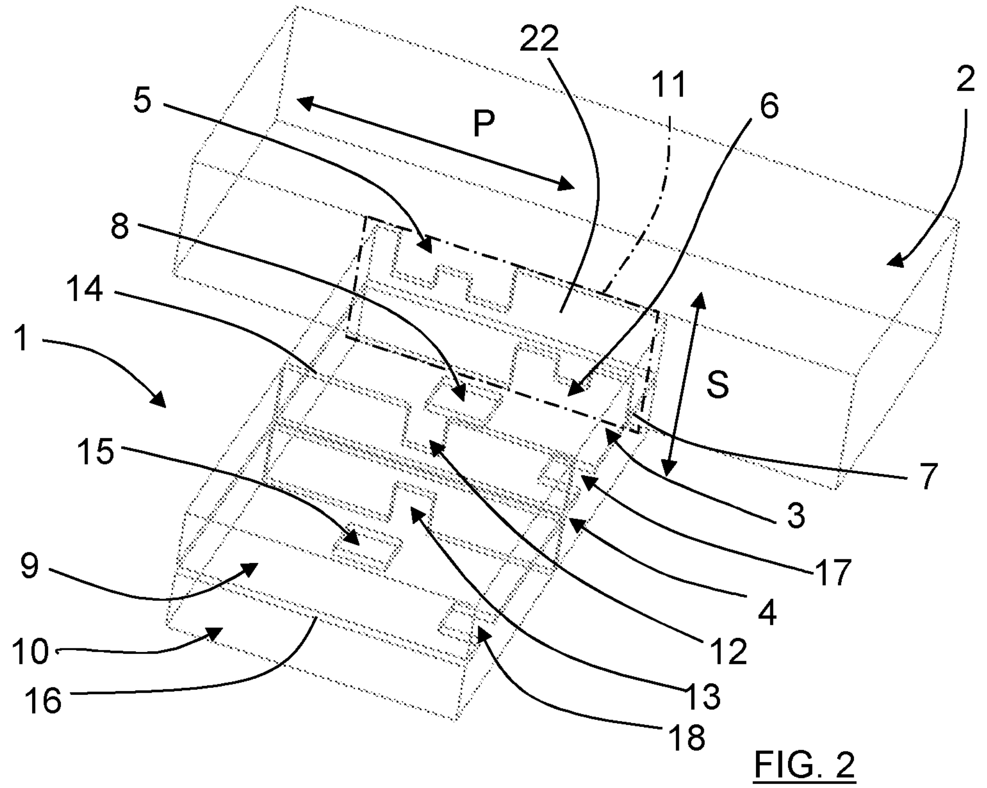
FIG. 2 shows a second simplified perspective view of the waveguide stop-band filter and the waveguide transmission line.
Figure 3:
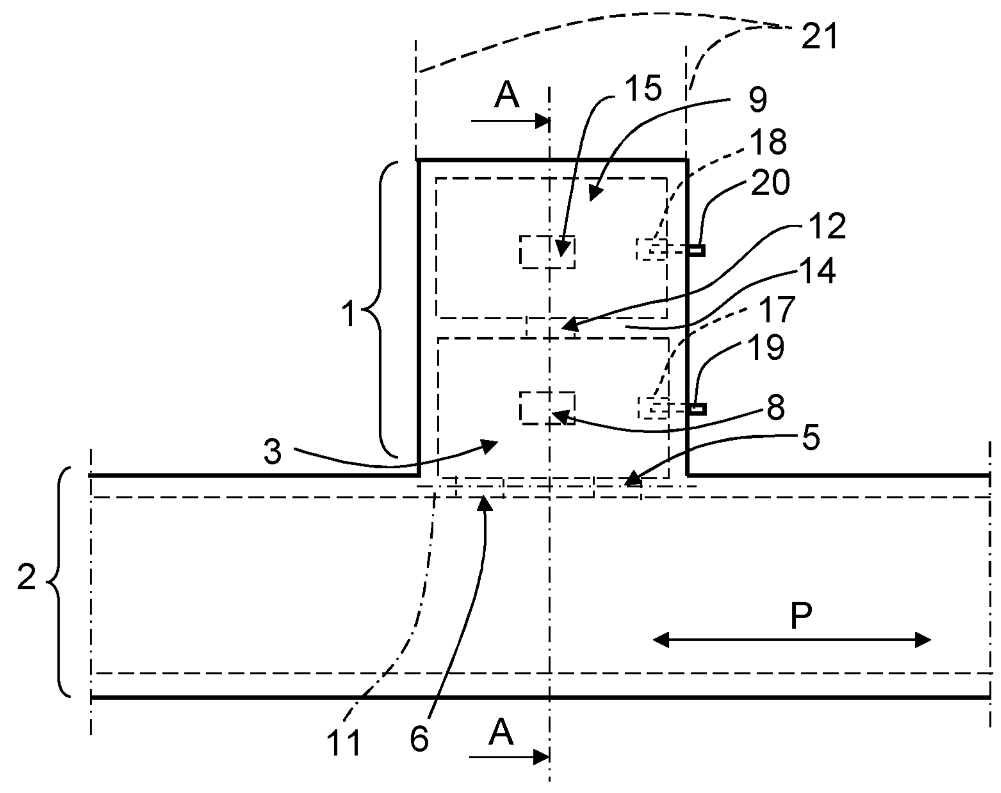
FIG. 3 shows a schematic top view of the waveguide stop-band filter and the waveguide transmission line.
Figure 4:
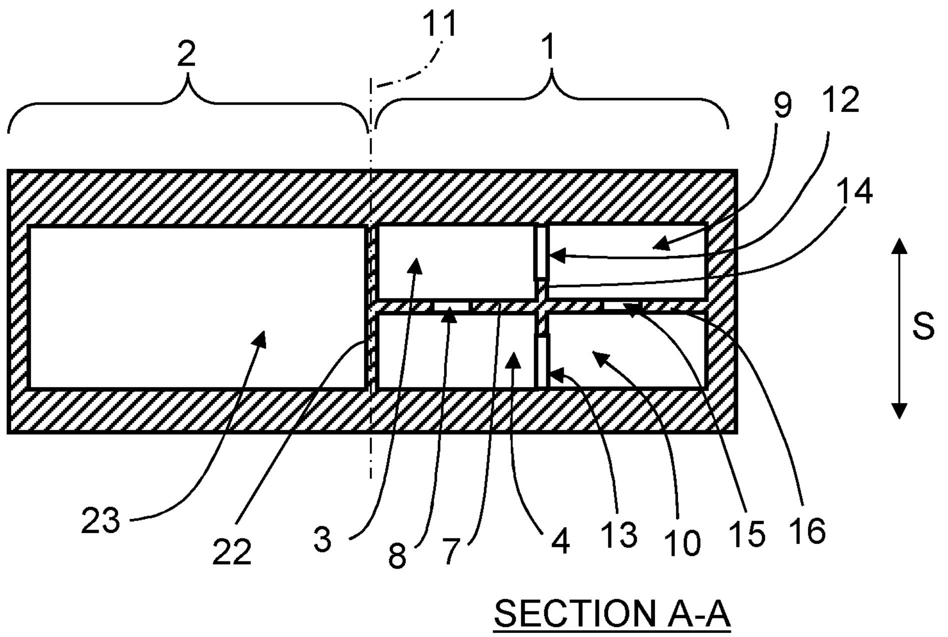
FIG. 4 shows a cross-section of FIG. 3.

With reference to FIG. 1 and FIG. 2 that show simplified perspective views of a waveguide stop-band filter and a waveguide transmission line, FIG. 3 that shows a schematic top view of the waveguide stop-band filter and the waveguide transmission line, and FIG. 4 that shows a cross-section of FIG. 3, there is a waveguide transmission line 2 of a well-known type that is adapted for transfer of microwave signals in a main propagation extension P, and is for example made in metal, comprising an enclosure 23 that can be filled with air or a suitable dielectric material.

There is also a waveguide band-stop filter 1 that is connected to the waveguide transmission line 2 at a filter interface 11 and comprises a first pair of cavities 3, 4, in turn comprising a first cavity 3 and a second cavity 4. Each cavity 3, 4 in the first pair, in the following referred to as each first pair cavity 3, 4, comprises a corresponding inductive first pair aperture arrangement 5, 6 that is adapted to connect the corresponding first pair cavity 3, 4 to the waveguide transmission line 2 at the filter interface 11. The filter interface 11 is formed in a wall part 22.

According to the present disclosure, the first pair cavities 3, 4 are positioned adjacent each other along a stacking extension S perpendicular to the main propagation extension P, according to some aspects the first cavity 3 on top of the second cavity 4, such that they share a first common wall 7 and are adapted to be positioned adjacent the waveguide transmission line 2. The first pair of cavities 3, 4 comprises a first capacitive aperture arrangement 8 in the first common wall 7, mutually connecting the first pair cavities 3, 4.

According to some aspects, the band-stop filter 1 comprises one or more further pairs of cavities, in the following a second pair of cavities 9, 10 will be described, but as indicated with dashed lines 21 in FIG. 3 there can be any number of further pairs of cavities extending away from the waveguide transmission line 2.

The second pair of cavities 9, 10, comprising a second cavity 9 and a fourth cavity 11, is connected to the first pair of cavities 3, 4. The first pair of cavities 3, 4 is positioned between the second pair 9, 10 of cavities and the filter interface 11. Each cavity in the second pair 9, 10, in the following referred to as each second pair cavity 9, 10, comprises a corresponding inductive second pair aperture arrangement 12, 13 that is adapted to connect the corresponding second pair cavity 9, 10 to a corresponding first pair second cavity via a corresponding common inter-pair wall 14.

The second pair cavities are positioned adjacent each other along the stacking direction S such that they share a second common wall 16, and the second pair of cavities 9, 10 comprises a second capacitive aperture arrangement 15 in the second common wall 16, mutually connecting the second pair cavities 9, 10.

Each aperture arrangement 5, 6; 8, 15; 12, 13 is shown to be constituted by a single aperture, but can of course be constituted by a plurality of apertures, and each aperture 5, 6; 8, 15; 12, 13 can have any suitable shape. Each aperture arrangement can be regarded as an iris opening arrangement.

For the case of the band-stop filter 1 comprising one or more further pairs of cavities in addition to the first pair of cavities 3, 4 there is generally at least one further pair of cavities 9, 10, where each further pair of cavities 9, 10 is connected to an adjacent pair of cavities 3, 4 that is positioned between the further pair of cavities 9, 10 and the filter interface 11. Each cavity 9, 10 in a further pair, each further pair cavity 9, 10, comprises a corresponding inductive further pair aperture arrangement 12, 13 that is adapted to connect the corresponding further pair cavity 9, 10 to a corresponding adjacent cavity 3, 4 via a corresponding common inter-pair wall 14. The further pair cavities 9, 10 are positioned adjacent each other along the stacking direction S such that they share a further common wall 16, and where the further pair of cavities 9, 10 comprises a further capacitive aperture arrangement 15 in the further common wall 16, mutually connecting the further pair cavities 9, 10.

The direct-coupled filter arrangement according to the present disclosure thus utilizes stacked cavities distributed in two layers. Beside reduced size, this allows introduction of negative coupling between the cavities coupled to the waveguide transmission line and reduces parasitic coupling between these cavities. This provides a building block with controllable couplings that consists of two cavities coupled to the waveguide transmission line 2, according to some aspects by means of inductive irises 5, 6 placed a quarter-wavelength away from each other.

The capacitive aperture arrangement 8, 15 located in the middle of each pair of cavities 3, 4; 9, 10 and produces negative couplings which are denoted as $Mn_{3\_4}$ and $Mn_{9\_10}$. These are uncontrollable, since the filter structure does not allow placement of tuning screws. In order to control the coupling between the pair of cavities 3, 4; 9, 10, according to some aspects, the first pair of cavities 3, 4 and the second pair of cavities 9, 10 comprises a corresponding complementary aperture arrangement 17, 18 arranged in the corresponding common wall 7, 16. According to some aspects, as illustrated in FIG. 3, each complementary aperture arrangement 17, 18 comprises at least one tuning screw 19, 20 such that the complementary aperture arrangements 17, 18 can be controlled.

The respective contributions of the complementary aperture arrangements 17, 18 is denoted as $Mp_{3\_4}$ and $Mp_{9\_10}$.

The apertures in the first pair aperture arrangement 5, 6, that is adapted to connect the corresponding first pair cavity 3, 4 to the waveguide transmission line 2 at the filter interface 11, comprises an aperture arrangement 5 for the first cavity 3 and another aperture arrangement 6 for the second cavity 4. There is a parasitic coupling $M_{par3\_4}$ between the cavities 3, 4 that can be reduced to a required level by a negative contribution from $Mn_{3\_4}$.

A corresponding resulting coupling $M_{3\_4}$ and $M_{9\_10}$ between the pair of cavities 3, 4; 9, 10 is defined as a corresponding net sum:

$$M_{9\_10}=Mn_{9\_10}+Mp_{9\_10} \quad (1)$$

$$M_{3\_4}=Mn_{3\_4}+Mp_{3\_4}+M\text{par}_{3\_4} \quad (2)$$

respectively.

It follows from equation (1) and (2) that a positive or negative level of coupling is chosen at will. Also, since one of the contributors in (1) and also (2) can be controlled, the total value can be controlled as well, and this allows control of the bandwidth of the waveguide band-stop filter 1 as it is tuned.

To realize the present waveguide band-stop filter 1 as tunable in a relatively wide frequency band, it is necessary to have all the couplings tunable/controllable and to reduce the parasitic coupling $M_{par3\_4}$ according to the above.

Figure 5:
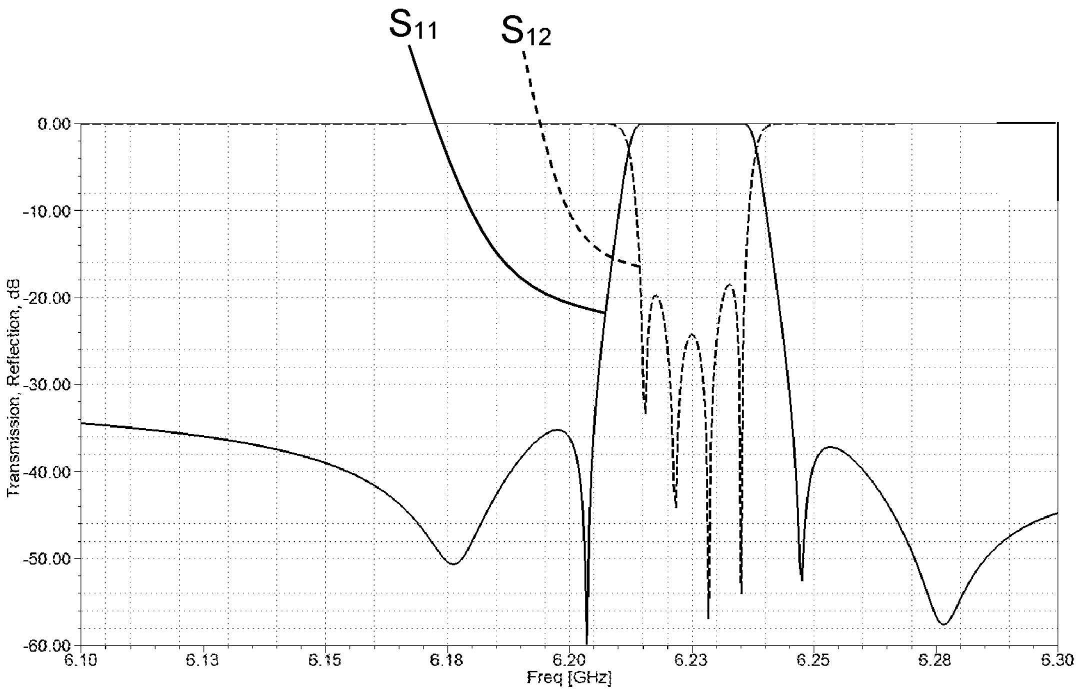
FIG. 5 shows transmission and reflection properties for the waveguide stop-band filter.

Simulated results for the present waveguide band-stop filter 1 are shown below in FIG. 5 where a reflection coefficient $S_{11}$ is shown in dB versus frequency with a solid line, and where a transmission coefficient $S_{12}$ is shown in dB versus frequency with a dashed line.

The present disclosure is not limited to the examples above, but may vary freely within the scope of the appended claims. For example, the waveguide parts may be made in any suitable material such as aluminum or plastics covered with an electrically conducting layer.

The present disclosure provides a practically meaningful realization of a direct coupled band-stop filter in waveguide technology. According to some aspects, the band-stop cavities, the pairs of cavities 3, 4; 9, 10, are coupled to ta broad side of a waveguide transmission line by apertures 5, 6 in the form of inductive irises can be placed at a quarter-wavelength away from each other. The band-stop cavities 3, 4; 9, 10 are arranged in two stacked layers which allows introduction of negative coupling and therefore enables compensation of positive parasitic coupling.

The band-stop filter is generally constituted by a band-stop filter arrangement.

Generally, the present disclosure relates to a waveguide band-stop filter arrangement 1 adapted to be connected to a waveguide transmission line 2 at a filter interface 11, which waveguide transmission line 2 is adapted for a main propagation extension P, the band-stop filter 1 arrangement comprising a first pair of cavities 3, 4. Each cavity 3, 4 in the first pair, each first pair cavity 3, 4, comprises a corresponding inductive first pair aperture arrangement 5, 6 that is adapted to connect the corresponding first pair cavity 3, 4 to the waveguide transmission line 2. The first pair cavities 3, 4 are positioned adjacent each other along a stacking extension S perpendicular to the main propagation extension P such that they share a first common wall 7 and are adapted to be positioned adjacent the waveguide transmission line 2. The first pair of cavities 3, 4 comprises a first capacitive aperture arrangement 8 in the first common wall 7, mutually connecting the first pair cavities 3, 4.

According to some aspects, the band-stop filter arrangement 1 further comprises at least one further pair of cavities 9, 10, where each further pair of cavities 9, 10 is connected to an adjacent pair of cavities 3, 4 that is positioned between the further pair of cavities 9, 10 and the filter interface 11. Each cavity 9, 10 in a further pair, each further pair cavity 9, 10, comprises a corresponding inductive further pair aperture arrangement 12, 13 that is adapted to connect the corresponding further pair cavity 9, 10 to a corresponding adjacent cavity 3, 4 via a corresponding common inter-pair wall 14, where the further pair cavities 9, 10 are positioned adjacent each other along the stacking direction S such that they share a further common wall 16. The further pair of cavities 9, 10 comprises a further capacitive aperture arrangement 15 in the further common wall 16, mutually connecting the further pair cavities 9, 10.

According to some aspects, at least one pair of cavities 3, 4; 9, 10 comprises a complementary aperture arrangement 17, 18 arranged in a corresponding common wall 7, 16, where each complementary aperture arrangement 17, 18 comprises at least one tuning screw 19, 20.

The invention claimed is:

1. A waveguide band-stop filter arrangement adapted to be connected to a waveguide transmission line at a filter interface, which waveguide transmission line is adapted for a main propagation extension, the band-stop filter arrangement comprising a first pair of cavities, where each cavity in the first pair, each first pair cavity, comprises a corresponding inductive first pair aperture arrangement that is adapted to connect the corresponding first pair cavity to the waveguide transmission line, wherein the first pair cavities are positioned adjacent each other along a stacking extension perpendicular to the main propagation extension such that they share a first common wall and are adapted to be positioned adjacent the waveguide transmission line, and where the first pair of cavities comprises a first capacitive aperture arrangement in the first common wall, mutually connecting the first pair cavities.

2. The waveguide band-stop filter arrangement according to claim 1, wherein the band-stop filter arrangement further comprises at least one further pair of cavities, where each further pair of cavities is connected to an adjacent pair of cavities that is positioned between the further pair of cavities and the filter interface, where each cavity in a further pair, each further pair cavity, comprises a corresponding inductive further pair aperture arrangement that is adapted to connect the corresponding further pair cavity to a corresponding adjacent cavity via a corresponding common inter-pair wall, where the further pair cavities are positioned adjacent each other along the stacking direction such that they share a further common wall, and where the further pair of cavities comprises a further capacitive aperture arrangement in the further common wall, mutually connecting the further pair cavities.

3. The waveguide band-stop filter arrangement according to claim 1, wherein at least one pair of cavities comprises a complementary aperture arrangement arranged in a corresponding common wall, where each complementary aperture arrangement comprises at least one tuning screw.

* * * * *